United States Patent
Reyhanloo

(10) Patent No.: US 9,144,344 B2
(45) Date of Patent: Sep. 29, 2015

(54) METHOD FOR AUTOMATICALLY PRODUCING MILK FROTH

(71) Applicant: Jura Elektroapparate AG, Niederbuchsiten (CH)

(72) Inventor: Shahryar Reyhanloo, Immensee (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 276 days.

(21) Appl. No.: 13/920,805

(22) Filed: Jun. 18, 2013

(65) Prior Publication Data

US 2013/0280403 A1    Oct. 24, 2013

Related U.S. Application Data

(63) Continuation of application No. PCT/CH2011/000310, filed on Dec. 30, 2011.

(30) Foreign Application Priority Data

Dec. 30, 2010   (EP) .................................... 10016188

(51) Int. Cl.
*A47J 31/44*    (2006.01)

(52) U.S. Cl.
CPC .................................. *A47J 31/4485* (2013.01)

(58) Field of Classification Search
CPC .................................................. A47J 31/4485
See application file for complete search history.

(56) References Cited

U.S. PATENT DOCUMENTS

| 6,449,389 B1 * | 9/2002 | Schweid ........................ 382/164 |
| 2007/0187421 A1 | 8/2007 | Constantine et al. |
| 2010/0236416 A1 * | 9/2010 | Bonsch et al. .................. 99/280 |

FOREIGN PATENT DOCUMENTS

| DE | 39 02 281 C1 | 6/1990 |
| EP | 2 229 851 A1 | 9/2010 |
| WO | WO 00/16674 A1 | 3/2000 |

OTHER PUBLICATIONS

International Preliminary Report on Patentability for Application No. PCT/CH2011/000310.

(Continued)

*Primary Examiner* — Rena L Dye
*Assistant Examiner* — Chaim Smith
(74) *Attorney, Agent, or Firm* — Alston & Bird LLP

(57) ABSTRACT

Provided are methods for automatically producing milk froth in a milk-frothing apparatus, and also a milk-frothing apparatus for automatically producing milk froth. The milk-frothing apparatus has at least one hollow space, a steam-inlet channel for introducing steam into the hollow space, a milk-inlet channel for introducing milk into the hollow space, an air-inlet channel for introducing air into the hollow space, and an outlet channel for discharging milk froth from the milk-frothing apparatus, wherein the respective channels each issue directly or indirectly into the hollow space. With the aim of specifying a method and a milk-frothing apparatus by means of which an organoleptic milk froth of which the taste is optimized can be automatically produced, the invention makes provision for steam, preferably steam from water, to be introduced into the steam-inlet channel in order to allow milk and air to flow into the hollow space and in order to mix said milk, air and steam to form a milk/air/steam mixture, and to then output the milk/air/steam mixture into the outlet channel, wherein a sweetening means is provided in a region of the milk-frothing apparatus through which at least the milk/air/steam mixture flows.

3 Claims, 3 Drawing Sheets

(56) References Cited

OTHER PUBLICATIONS

International Search Report for Application No. PCT/CH2011/000310, dated Apr. 10, 2012.
PCT Response; Translation, Oct. 30, 2012.
*Making Flavored Lattes*, [online] [retrieved on Jul. 1, 2015]. Retrieved from: <URL: http://www.home-barista.com/tips/making-flavored-lattes-t2505.html>(dated Nov. 29, 2006) 4 pages.
*A Newbie Questions About Italian Coffee Tradition and Sugar*, [online] [retrieved on Jul. 1, 2015] Retrieved from <URL: http://home-barista.com/coffees/newbie-question-about-italian-coffee-tradition-and-sugar-t2028.html> (dated Aug. 3, 2006) 4 pages.

* cited by examiner

METHOD FOR AUTOMATICALLY PRODUCING MILK FROTH

CROSS-REFERENCE TO RELATED APPLICATIONS

This application is a continuation of and claims priority to International Application No. PCT/CH2011/000310, filed Dec. 30, 2011, which claims priority to EP Application No. 10016188.4, filed Dec. 30, 2010, the entire contents each of which are incorporated herein by reference.

TECHNOLOGICAL FIELD

The invention relates to a method for automatically producing milk froth in a milk-frothing apparatus and to a milk-frothing apparatus for automatically producing milk froth.

BACKGROUND

Automatic milk-frothing apparatuses, which can be arranged at fully automatic coffee machines, for example, are known from technology, wherein the milk froth for coffee beverages, such as cappuccino, for example, is produced automatically by means of such a known milk-frothing apparatus and is output at one end of a milk froth outputting channel. In such milk-frothing apparatuses, the venturi effect is used for the suction process and further transportation as well as for the necessary swirling of the milk, wherein hot steam, generally steam from water, is introduced in an area of the known milk-frothing apparatus, so that this steam flows past a milk-inlet channel and thereby generates a low pressure, wherein milk is in each case sucked in from a storage container through the milk-inlet channel due to the low pressure.

This milk, which is sucked in by means of the steam, flows through a hollow space in the interior of such a known milk-frothing apparatus and is swirled at that location. In the case of such known milk-frothing apparatuses, it is additionally known to provide for an air-inlet channel, through which air in addition to the milk is also sucked in when the steam from water flows by, the air being swirled together with the milk in the hollow space. The milk or the milk-steam mixture, respectively, if necessary enriched with air to form a milk-steam-air mixture, reaches from the hollow space into a so-called emulsion chamber, in which the frothing process is concluded and the swirled mixture is slowed down. An output channel for the produced mixture connects to the emulsion chamber, the output channel leading out of the milk-frothing apparatus and generally leading into a milk froth output apparatus of the fully automatic coffee machine.

SUMMARY

Based on the outlined problems, the invention at hand is based on the task of specifying a method for automatically producing milk froth, which delivers an organoleptic milk froth, of which the taste is optimized, which is particularly fine, dense, creamy and appealing in terms of taste.

This object is solved by means of a method comprising the features of patent claim 1.

The method for automatically producing milk froth is based on a milk-frothing apparatus, which encompasses at least one hollow space, a steam-inlet channel for introducing steam into the hollow space, a milk-inlet channel for introducing milk into the hollow space, an air-inlet channel for introducing air into the hollow space, and an outlet channel for discharging milk froth from the milk-frothing apparatus, and an emulsion chamber, which is arranged between the hollow space and the outlet channel, wherein the steam-inlet channel, the milk-inlet channel, the air-inlet channel, the emulsion chamber and the outlet channel are in each case directly or indirectly connected to the hollow space and a milk-air-steam mixture can be produced in the hollow space by introducing steam into the hollow space and can be introduced into the emulsion chamber. The method encompasses at least the following method steps: (i) introducing steam into the steam-inlet channel, so as to let milk and air flow into the hollow space and to swirl them to form a milk-air-steam mixture, and (ii) outputting the milk-air-steam mixture from the emulsion chamber into the outlet channel.

According to the invention, a sweetening means, which is present in solid form, the emulsion chamber, wherein the sweetening means is embodied as a body, which is shaped to form a block, and this body is arranged in the emulsion chamber before the introduction of steam into the steam-inlet channel takes place, so that the milk-air-steam mixture flows around the sweetening means and the sweetening means is dissolved in the milk-air-steam mixture.

The method according to the invention has considerable advantages as compared to the state of the art. On the one hand, adding the sweetening means, preferably sugar, in an area, through which the milk-air-steam mixture flows directly during the milk-frothing process, has a substantially even impact on the entire milk quantity, which flows through the milk-frothing apparatus, or on the milk-air-steam mixture, which flows through the milk-frothing apparatus, whereby a sweetened milk froth is produced, which surprisingly (as compared to the milk froth, to which no sweetening means was added in response to the frothing of the respective milk) encompasses a finer and denser structure and which is creamier, which has a positive effect on the taste and on the organoleptics when consuming a coffee beverage, which was prepared with such a milk froth.

It is thus furthermore ensured that the taste-improving, sweetening characteristics of the sweetening agent are distributed very evenly, based on the total volume of milk, which flows through the milk-frothing apparatus, so that the total volume of milk froth tastes sweet.

Last but not least, by already introducing the sweetening means within the milk-frothing apparatus, it is attained that already sweetened milk froth is output from the milk-frothing apparatus when the method according to the invention is carried out, which makes it unnecessary to additionally sweeten the coffee beverage, which is provided with such a milk froth.

Due to the fact that the milk-frothing apparatus encompasses an air-inlet channel, which is indirectly or directly connected to the hollow space, and into which air flows, it is attained that this air is swirled together with the milk, whereby the froth structure of the milk froth, which is produced, can be varied, for example by increasing or decreasing the air-inlet channel cross section, depending on the added air quantity. By means of such an air-inlet channel, which is preferably designed so as to be variable, the advantage can be attained that heated milk is output from the milk-frothing apparatus in combination with a particularly fine-pored milk froth in particular when adding air to the milk (which is cold, if necessary), which flows into the hollow space, wherein the milk froth encompasses the fine and dense froth structure, which is advantageous according to the invention, and in addition that the heated output milk as well as the milk froth are already sweetened when being output from the milk-frothing apparatus.

The emulsion chamber is arranged between the hollow space and the outlet channel of the milk-frothing apparatus, the milk-air-steam mixture—starting at the hollow space—flows through the emulsion chamber to the outlet channel, so that the milk-air-steam mixture in each case flows through the emulsion chamber (downstream from the hollow space and upstream of the outlet channel), wherein the sweetening means is then introduced into the emulsion chamber when the method according to the invention is carried out. This is advantageous in particular when the emulsion chamber is embodied so as to be accessible from the outside and when it is possible to manually introduce the sweetening means into the emulsion chamber.

Provision can be made for using sweetening means in solid form, for example in the form of a body, which is shaped to form a block (e.g. as a lump of sugar and preferably in the form of a cylinder-shaped, cube-shaped or ball-shaped lump of sugar). A solid sweetening means has the advantage of an improved handling. The solid sweetening means can thereby in particular be formed such that at least the milk-air-steam mixture flows around it or also through it. Provision can thus be made, for example, to embody the solid sweetening means as a lump of sugar (e.g. as a sugar cube), which encompasses a hole, through which the milk-air-steam mixture can flow. It is then attained with such a design that the surface of such a lump of sugar is enlarged, so as to result in an improved or quicker dissolvability, respectively, of the lump of sugar in the milk-air-steam mixture, which flows through the respective hole and/or which flows around the respective lump of sugar, due to the enlarged surface.

In the case of the method according to the invention, provision can furthermore be made for the sweetening means to be introduced into the area emulsion chamber of the milk-frothing apparatus, before the steam is introduced into the steam-inlet channel. It is ensured through this that the sweetening means is available immediately for being mixed, as soon as the milk-steam-air mixture reaches the area, in which the sweetening means is positioned. It can thereby in particular be attained that the sweetening means can impact the milk, which is swirled in the milk-frothing apparatus, for a particularly long period of time and that the respective produced milk froth is sweetened to a particularly intensive and even extent.

An apparatus for automatically producing milk froth (hereinbelow "milk-frothing apparatus") according to the method according to the invention encompasses at least one hollow space, a steam-inlet channel for introducing steam into the hollow space, a milk-inlet channel for introducing milk into the hollow space, an air-inlet channel for introducing air into the hollow space and an outlet channel for outputting milk froth from the milk-frothing apparatus. The steam-inlet channel, the milk-inlet channel, the air-inlet channel and the outlet channel are thereby in each case directly or indirectly connected to the hollow space, so that steam, which is introduced through the steam-inlet channel, milk, which is introduced through the milk-inlet channel, and air, which is introduced through the air-inlet channel, can be swirled in the hollow space to form a milk-air-steam mixture and so that the milk-air-steam mixture can be output from the milk-frothing apparatus through the outlet channel. Such a milk-frothing apparatus furthermore encompasses a device for introducing sweetening means into an area of the milk-frothing apparatus, through which at least the milk-air-steam mixture flows during a frothing process.

Such a device for introducing sweetening means, which is provided at such a milk-frothing apparatus, makes it possible in an advantageous manner to produce dense and creamy milk froth, which is evenly sweetened and the froth structure of which is particularly fine or fine-pored, respectively, by automatically producing milk froth during a frothing process.

The milk-frothing apparatus encompasses an emulsion chamber, which is arranged between the hollow space and the outlet channel, wherein the emulsion chamber is connected to the hollow space and the outlet channel such that the milk-air-steam mixture can flow through at least one area of the emulsion chamber during a frothing process, wherein the device for introducing sweetening means is embodied to introduce the sweetening means into the area of the emulsion chamber, through which the milk-air-steam mixture can flow. The milk-air-steam mixture thereby flows through the emulsion chamber during a frothing process. Such a device for introducing sweetening means into the emulsion chamber of the milk-frothing apparatus can allow for a pivoting of the emulsion chamber, for example, so that the emulsion chamber or at least a partial area of the emulsion chamber becomes accessible from the outside and that solid and/or liquid sweetening means can be introduced into the emulsion chamber. It is furthermore possible to embody such a device for introducing sweetening means into the emulsion chamber as an opening to the emulsion chamber interior, wherein sweetening means can be introduced into the interior of the emulsion chamber through the opening and wherein the opening can be closed after the sweetening means has been introduced in preparation for a frothing process.

BRIEF DESCRIPTION OF THE DRAWINGS

Exemplary embodiments of a milk-frothing apparatus, in particular for use in a method according to the invention for automatically producing milk froth, will be explained in more detail below by means of a drawing, in which.

DETAILED DESCRIPTION

Figure 1:
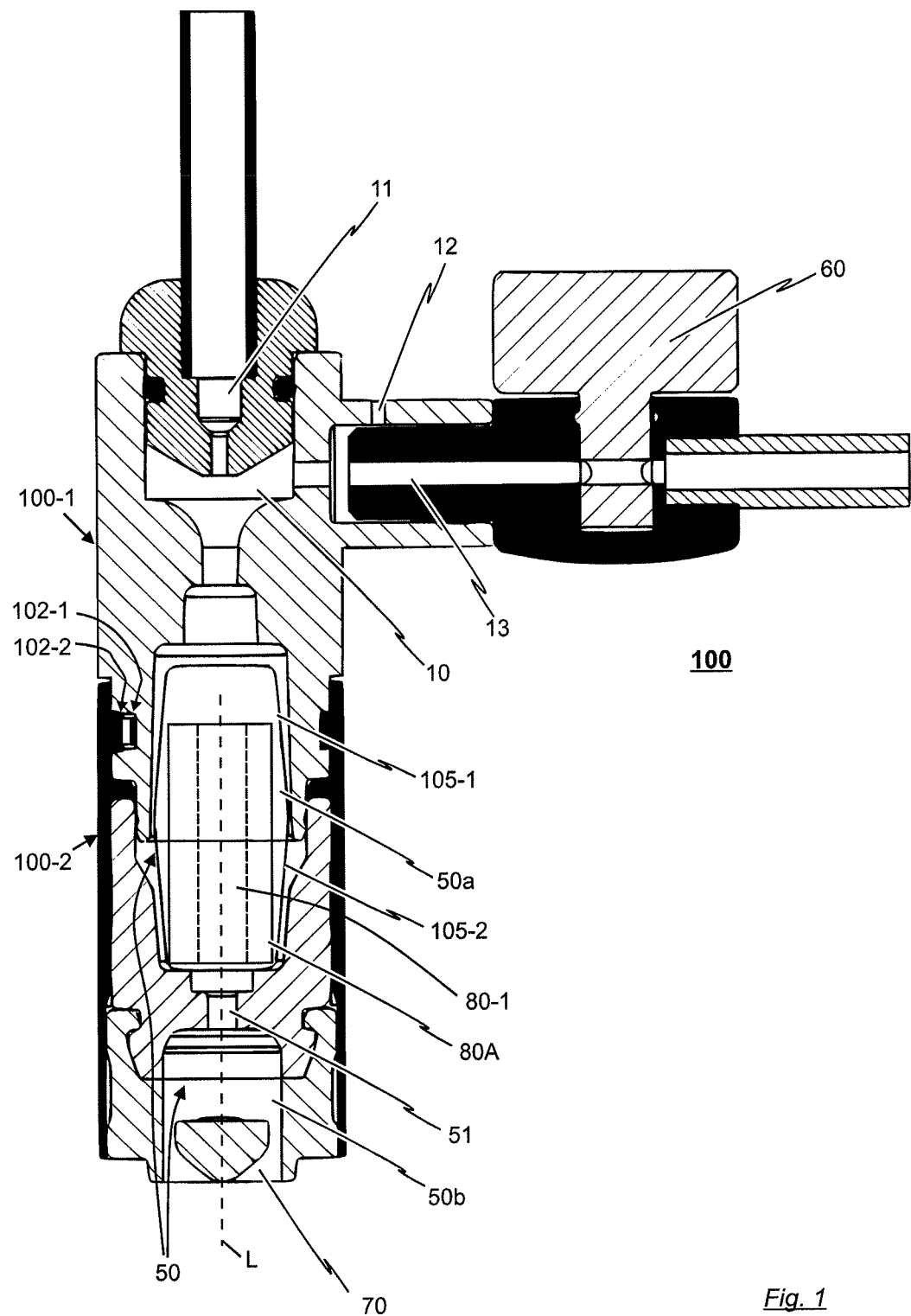
FIG. 1 shows a sectional view onto a first exemplary embodiment of a milk-frothing apparatus.

FIG. 1 shows a sectional view onto a first exemplary embodiment of a milk-frothing apparatus 100, in particular for carrying out a method for automatically producing milk froth according to the invention. According to FIG. 1, the milk-frothing apparatus 100 encompasses a hollow space 10, into which steam, in particular steam from water, can be introduced through a steam-inlet channel 11, so that said steam flows through the hollow space 10. A further channel, which branches into a milk-inlet channel 13 and an air-inlet channel 12, is furthermore directly connected to the hollow space 10 and is illustrated in FIG. 1 so as to be located to the right of the hollow space 10. The air-inlet channel 12 allows for air to flow into the hollow space 10, while the milk-inlet channel 13, at its end, which faces away from the hollow space 10, leads into a storage container for milk, which is not shown in FIG. 1.

Provision can furthermore be made for a regulating valve 60, which partially closes the milk-inlet channel 13 for the purpose of measuring the milk. In the event that steam is introduced into the steam-inlet channel 11, a low pressure is created based on the Venturi effect when flowing past the mouth area of the channel system with the air-inlet channel 12 and the milk-inlet channel 13, whereby milk and air are sucked in and are introduced into the hollow space 10. This introduced and sucked-in mixture of milk, air and steam ("milk-air-steam mixture") is then swirled in the hollow space 10, which contributes to the production of the milk froth. The milk-air-steam mixture then reaches into an emulsion chamber 50, in which the turbulent flow, which is still present in the hollow space 10, is slowed down and the milk-air-steam mixture is homogenized, so that an emulsion of milk (drops), steam (bubbles) and/or air (bubbles), which form the milk froth, is produced in the emulsion chamber 50.

In the shown first exemplary embodiment according to FIG. 1, the further mixing of the milk, which is sucked in, with the steam and the air, which is also sucked in, takes place in the emulsion chamber 50, whereby the milk froth is produced or its structure is influenced or densified, respectively.

As is suggested in FIG. 1, the emulsion chamber 50 in the example at hand is divided into two partial spaces—the first partial space 50a and the second partial space 50b—, wherein the partial spaces 50a and 50b are connected by means of a connection channel 51. The partial space 50a is thereby connected to the hollow space 10 such that the respective mixture of milk, steam and air, which is produced in the hollow space 10, is introduced into the first partial space 50a of the emulsion chamber 50 and can subsequently reach into the second partial space 50b of the emulsion chamber 50 only via the connection channel 51. As is suggested in FIG. 1—the connection channel 51 has a cross sectional surface, which is considerably smaller (e.g. by more than a factor of 2) than a cross sectional surface of the first partial space 50a. Due to the fact that the connection channel 51 is accordingly relatively narrow as compared to the partial space 50a and to the partial space 50b, it is attained that the mixture of milk, steam and air, which is in each case introduced into the first partial space 50a of the emulsion chamber 50, backs up initially, before it can flow into the second partial space 50b of the emulsion chamber 50, so that the mixture of milk, steam and air can initially mix or homogenize and calm down, respectively, in the first partial space 50a. When the mixture of milk, steam and air, which is backed up in the first partial space 50a, finally flows through the connection channel 51 into the second partial space 50b of the emulsion chamber 50, it is typically accelerated in the connection channel 51 in the longitudinal direction of the connection channel 51, so that the mixture of milk, steam and air flows through the connection channel 51 in the form of a flow, the flow speed of which encompasses a gradient, which is oriented substantially parallel to the flow speed (that is, in longitudinal direction of the connection channel 51). This flow has the effect that milk drops or bubbles of steam and/or air, respectively, are deformed in the flow in the direction of the gradient of the flow speed, wherein the deformation of the respective milk drops or bubbles of steam and/or air, respectively, is greater, the greater the speed gradient is. In the example at hand, the length and the cross sectional surface of the connection channel 51 can be chosen such that milk drops or bubbles of steam and/or air, respectively, which flow through the connection channel 51, are deformed in the connection channel 51 to the extent that individual milk drops are in each case divided into a plurality of smaller milk drops, and individual bubbles of steam and/or air are in each case divided into a plurality of smaller bubbles of steam and/or air. Accordingly, the division of the emulsion chamber 50 into the partial spaces 50a and 50b and the connection of the partial spaces 50a and 50b by means of the connection channel 51 ensures that the mixture of milk, steam and air, which flows via the connection channel 51 into the second partial space 50b of the emulsion chamber 50, comprises particularly small milk drops and particularly small bubbles of steam and/or air and accordingly forms a particularly fine-pored milk froth.

As is suggested in FIG. 1, a sweetening means 80A has been introduced into the emulsion chamber 50 (into the first partial space 50a of the emulsion chamber 50 in the example at hand) in the example at hand—even before steam is introduced into the steam-inlet channel 11, so as to suck milk and air into the hollow space 10 and so as to allow the steam to flow into the hollow space 10 together with the milk, which has been sucked in, and the air, which has been sucked in. In the example at hand, the sweetening means 80A is present in the form of a lump of sugar, which encompasses a continuous hole 80-1 (suggested in FIG. 1 by means of two dashed lines, which identify the surface of the lump of sugar, which defines the hole 80-1).

When steam is finally introduced into the steam-inlet channel 11 after introducing the sweetening means 80A into the emulsion chamber 50, so that milk and air is sucked into the hollow space 10 and the steam flows into the emulsion chamber 50 in the form of a milk-air-steam mixture together with the milk, which is sucked in, and the air, which is sucked in, the respective milk-air-steam mixture flows around the surface of the sweetening means 80A and can thereby also flow through the hole 80-1, resulting in the sweetening means 80A being dissolved at least partially or completely, if applicable, in the respective milk-air-steam mixture, whereby a milk froth, which is homogenously sweetened and the structure of which is fine and dense, is embodied, which subsequently flows through the connection channel 51 and reaches into the second partial space 50b of the emulsion chamber 50. An outlet channel 70 in the form of an outlet ring gap, through which the automatically produced sweetened milk froth is subsequently output from the emulsion chamber 50, is embodied in the lower area of the milk-frothing apparatus 100, which is shown in FIG. 1.

It is pointed out that, in the case of the sweetening means 80A, which is illustrated in FIG. 1, the continuous hole 80-1 is not absolutely necessary. The sweetening means 80A illustrated in FIG. 1 can be embodied so as to be cylindrical, cube-shaped or cuboid-shaped or can also be replaced with a lump of sugar, comprising any other form, for example a ball-shaped lump of sugar. Each of the above-mentioned lumps of sugar can be arranged in the emulsion chamber 50a, preferably in the first partial space 50a of the emulsion chamber 50a, before the milk-air-steam mixture is introduced into the emulsion chamber 50, whereby the milk-air-stream mixture, which is in each case introduced into the emulsion chamber 50, flows around the respective lump of sugar in the emulsion chamber 50 and thereby dissolves it. The respective lump of sugar can comprise 1-3 grams of sugar, for example (that is, the quantity of sugar, which is contained in a standard sugar cube).

To make it possible for the sweetening means 80A in the exemplary embodiment according to FIG. 1 to be introduced into the emulsion chamber 50, the milk-frothing apparatus 100 is designed such that it is comprised of two parts—an upper part 100-1 and a lower part 100-2, wherein the lower part 100-2 can be moved relative to the upper part 100-1 between different positions. In one of the respective positions (as is illustrated in FIG. 1), the upper part 100-1 and the lower part 100-2 together define the emulsion chamber 50. In the example at hand, the upper part 100-1 comprises the hollow space 10, the steam-inlet channel 11, the milk-inlet channel 13 and the air-inlet channel 12, among others.

On a side, which faces the upper part 100-1, the lower part 100-2 encompasses a recess 105-2, which forms at least a part of the emulsion chamber 50. As is suggested in FIG. 1, the upper part, on a side facing the lower part 100-2, can encompass a recess 105-1, which is connected to the hollow space 10, so that—when the lower part 100-2 has been brought into the position illustrated in FIG. 1 relative to the upper part 100-1—the recess 105-2 together with the recess 105-1 form the first partial space 50a of the emulsion chamber 50. Based on the position illustrated in FIG. 1, the lower part 100-2 can be moved relatively to the upper part 100-1 into another position (not illustrated in FIG. 1), in which the lower part 100-2 is separated from the upper part 100-1 such that the emulsion chamber 50 can be accessed from outside and is thus open, so that the sweetening means 80A (in the form illustrated in FIG. 1) can be introduced into the emulsion chamber 50 (e.g. into the first partial space 50a of the emulsion chamber 50). When the lower part 100-2 is separated from the upper part 100-1, the sweetening means 80A (as a whole in one piece) can be arranged in the recess 105-2, for example, in the lower part 100-2. The lower part 100-2 can subsequently be brought back into the position illustrated in FIG. 1, wherein the emulsion chamber 50 is closed. The sweetening means 80A in the emulsion chamber 50 is thus encased between the upper part 100-1 and the lower part 100-2, when the lower part 100-2 is brought back into the position illustrated in FIG. 1.

To be able to move the lower part 100-2 relative to the upper part 100-1—as mentioned above—between different positions in a simple manner, the lower part 100-2 and the upper part 100-1 can be connected by means of suitable coupling elements, for example. Such coupling elements can be realized in a variety of ways, for example as screw coupling or plug-in coupling. The lower part 100-2 and the upper part 100-1 can be connected such, for example, that the lower part 100-2 and the upper part 100-1 can be connected to one another or separated from one another by means of a plug-in/rotary movement. For this purpose—as suggested in FIG. 1—the upper part 100-1 can be equipped at its lower end with a thread 102-1 and the lower part 100-2 can be equipped at its upper end with a thread 102-2, wherein the thread 102-2 is adapted to the thread 102-1 such that a screw connection between the lower part 100-2 and the upper part 100-1 can be established or such a screw connection can be released via the threads 102-1 and 102-2, respectively, by rotating the lower part 100-2 about a longitudinal axis L. In this case, the lower part 100-2 can be unlocked by means of a manual rotation and can subsequently be removed downward in axial direction and can thus be separated from the upper part 100-1. The respective inclines of the threads 102-1 and 102-2 can be chosen such, for example, that the lower part 100-2 must in each case be rotated by approx. 90° about the longitudinal axis L for establishing or releasing the mentioned screw connection, respectively.

After separating the lower part 100-2 from the upper part 100-1, the user can manually place the sweetening means 80A, in the case at hand in the form of the lump of sugar illustrated in FIG. 1, into the lower part 100-2 or into the recess 105-2, respectively, which is embodied in the lower part 100-2. The lower part can subsequently be fastened to the upper part 100-1 again by means of an axial lifting movement and rotation (according to the arrangement of the lower part 100-2 illustrated in FIG. 1). In the case at hand, the axial lifting movement is advantageously made automatically with the rotation (due to the embodiment of the threads 102-1 and 102-2).

In the alternative, the lower part 100-2 can also be connected to the upper part 100-1 by means of a bayonet closure, so that—when the bayonet closure is open—the lower part 100-2 is separated from the upper part 100-1 and the sweetening means 80A can optionally be arranged in the recess 105-1 or in the recess 105-2, before the lower part 100-2 is connected again to the upper part 100-1 by means of the bayonet closure.

In a further alternative, the lower part 100-2 can be arranged on a guide, which provides for a guided relative movement of the lower part 100-2 relative to the upper part 100-1 (in each case between the position of the lower part 100-2 illustrated in FIG. 1 and another position of the lower part 100-2, said position making it possible to optionally arrange the sweetening means 80A in the recess 105-1 or in the recess 105-2. The guide can be a linear guide, for example. In the alternative, the lower part 100-2 can also be rotatably supported on a pivot axis, so that the lower part 100-2 can be moved in a rotation about the pivot axis relative to the upper part 100-1. The pivot axis can thereby be oriented horizontally or vertically, for example.

Figure 2:
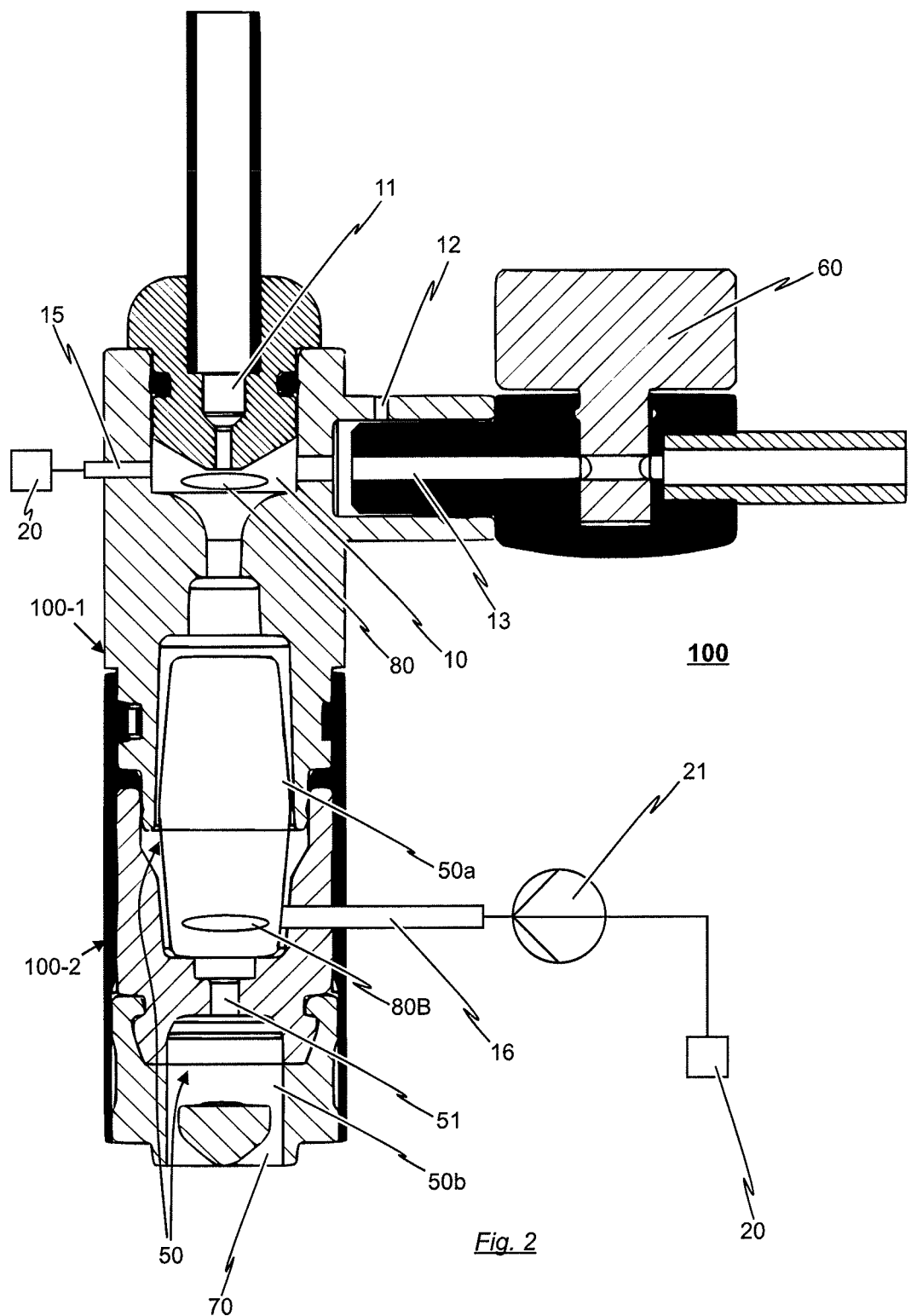
FIG. 2 shows a sectional view onto a second exemplary embodiment of a milk-frothing apparatus.

FIG. 2 shows a sectional view of a second exemplary embodiment of the milk-frothing apparatus 100 wherein the same reference numerals illustrate the same elements or elements acting in the same manner, as in FIG. 1. In addition to the first exemplary embodiment from FIG. 1, a first sweetening means inlet channel 15, which leads into the hollow space 10, is present in the case of the second exemplary embodiment according to FIG. 2. It is illustrated schematically that a storage container 20 for liquid sweetening means 80B is connected to the other end of the first sweetening means inlet channel 15. In response to a frothing process and the introduction of steam into the steam-inlet channel 11 associated therewith, a lower pressure is also generated in this first sweetening means inlet channel 15 due to the Venturi effect, which causes the liquid sweetening means 80B to flow into the hollow space 10 through the first sweetening means inlet channel 15. An early mixing of the components steam, milk, air, which are introduced or sucked in, respectively, as well as of the (liquid) sweetening means 80B thus already takes place here. In a similar manner as in the first exemplary embodiment according to FIG. 1, this mixture subsequently reaches into the emulsion chamber 50, wherein provision is made in this second exemplary embodiment according to FIG. 2 at the emulsion chamber 50 for an additional second sweetening means inlet channel 16, which leads into this chamber. Due to the fact that a noteworthy low pressure is not generated within the emulsion chamber 50, provision is made for an active introducing device 21 for liquid sweetening means, advantageously a pump, which introduces liquid sweetening means 80B from a storage container 20 through this second sweetening means inlet channel 16 into the interior of the emulsion chamber 50, for transporting the liquid sweetening means 80B through this second sweetening means inlet channel 16. Analogously to the first exemplary embodiment from FIG. 1, a further mixing with the liquid sweetening means 80B, which is introduced into the emulsion chamber 50, then takes place here, before the mixture, that is, the sweetened milk froth comprising a fine and dense structure, is introduced into the connection channel 51 and is output through the outlet channel 70.

It goes without saying that, modeled after the second exemplary embodiment according to FIG. 2, it is also possible in each case to provide only one of the two sweetening means inlet channels 15, 16 with an assigned storage container 20 for liquid sweetening means, and, if necessary, with an introducing device 21. This means that it goes without saying that it is likewise possible to introduce sweetening means 80 only into the hollow space 10 or only into the emulsion chamber 50, respectively.

Figure 3:
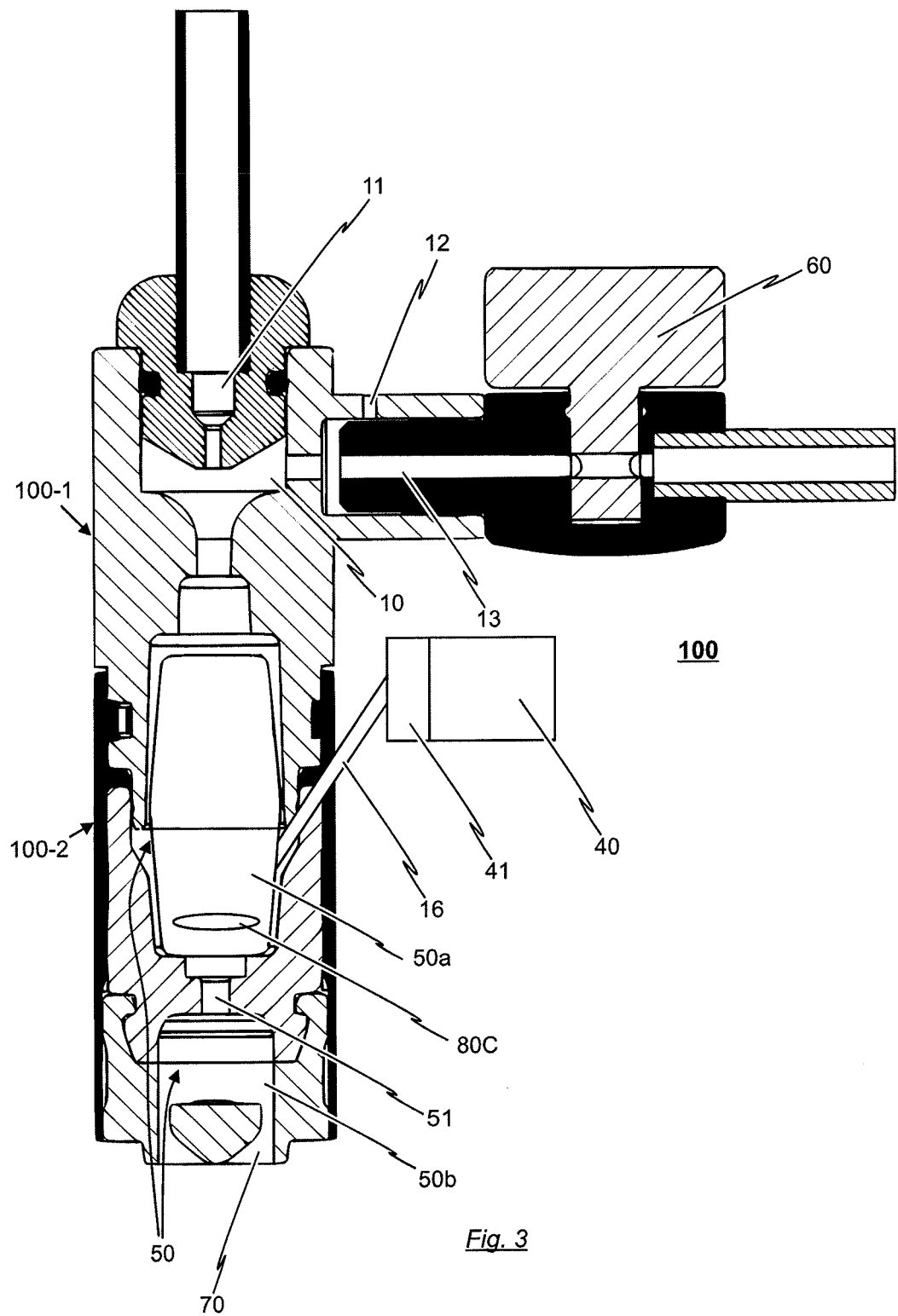
FIG. 3 shows a sectional view onto a third exemplary embodiment of a milk-frothing apparatus.

In contrast to the second exemplary embodiment according to FIG. 2, not a liquid, but solid sweetening means 80C is introduced into the interior of the emulsion chamber 50 in the third exemplary embodiment shown in FIG. 3, through the second sweetening means inlet channel 16, which is also provided at that location. Instead of the storage container 20 for liquid sweetening means, provision is made for this purpose for a storage container 40 for solid, if necessary powdery sweetening means 80C, which can be introduced into the interior of the emulsion chamber 50 by means of an introducing device 41, where, analogously to the two above-described exemplary embodiments, a mixing with the sweetening means 80C, which dissolves, if necessary, takes place. As in the case of the introducing device 21 for liquid sweetening means according to the second exemplary embodiment illustrated in FIG. 2, the introducing device 41 for solid, if necessary powdery sweetening means 80C according to the third exemplary embodiment illustrated in FIG. 3, can be operated manually or can also work automatically. In particular in the case of an automatic embodiment, it is possible to add a predetermined quantity of sweetening means in a simple manner.

That which is claimed is:

1. A method for automatically producing milk froth in a milk-frothing apparatus, wherein the milk-frothing apparatus encompasses at least one hollow space, a steam-inlet channel for introducing steam into the hollow space, a milk-inlet channel for introducing milk into the hollow space, an air-inlet channel for introducing air into the hollow space, an outlet channel for discharging milk froth from the milk-frothing apparatus and an emulsion chamber, which is arranged between the hollow space and the outlet channel, and wherein the steam-inlet channel, the milk-inlet channel, air-inlet channel, the emulsion chamber and the outlet channel are in each case directly or indirectly connected to the hollow space and a milk-air-steam mixture can be produced in the hollow space by introducing steam into the hollow space and can be introduced into the emulsion chamber, wherein the method encompasses the following method steps:

introducing steam into the steam-inlet channel, so as to let milk and air flow into the hollow space and to swirl said steam, milk, and air to form a milk-air-steam mixture;

outputting the milk-air-steam mixture from the emulsion chamber into the outlet channel;

wherein the method furthermore encompasses the following method step:

introducing a sweetening means, which is present in solid form, into the emulsion chamber, wherein the sweetening means is embodied as a body, which is shaped to form a block, and this body is arranged in the emulsion chamber before the introduction of steam into the steam-inlet channel takes place, so that the milk-air-steam mixture flows around the sweetening means and the sweetening means is dissolved in the milk-air-steam mixture.

2. The method according to claim 1, wherein the sweetening means is embodied as a block, which encompasses the shape of a cylinder, of a cube, of a cuboid or of a ball or another shape, or as sugar cube.

3. The method according to claim 2, wherein the milk-frothing apparatus comprises an upper part and a lower part and the lower part is arranged such that it can be moved towards or away from the upper part between a first position and a second position, wherein a recess, which—when the lower part is brought into the first position relative to the upper part—forms an area of the emulsion chamber through which the milk-air-steam mixture can flow, is defined by in the lower part, and wherein the lower part—when the lower part is brought into the second position—is separated from the upper part such that the recess can be accessed and the sweetening means can be arranged in the recess as a whole, wherein the method comprises the method steps:

the lower part is moved into the second position prior to the method step "introducing steam into the steam-inlet channel", the sweetening means is subsequently arranged in the recess and the lower part is moved into the first position.

* * * * *

UNITED STATES PATENT AND TRADEMARK OFFICE
CERTIFICATE OF CORRECTION

PATENT NO. : 9,144,344 B2
APPLICATION NO. : 13/920805
DATED : September 29, 2015
INVENTOR(S) : Reyhanloo Page 1 of 1

It is certified that error appears in the above-identified patent and that said Letters Patent is hereby corrected as shown below:

In the claims:

Column 10,
Line 29, "is defined by in the lower part" should read --is defined by the lower part--.

Signed and Sealed this
Fifteenth Day of March, 2016

Michelle K. Lee
*Director of the United States Patent and Trademark Office*